M. GESSLER.
WATER FILTER.
APPLICATION FILED DEC. 18, 1909.
956,698. Patented May 3, 1910.
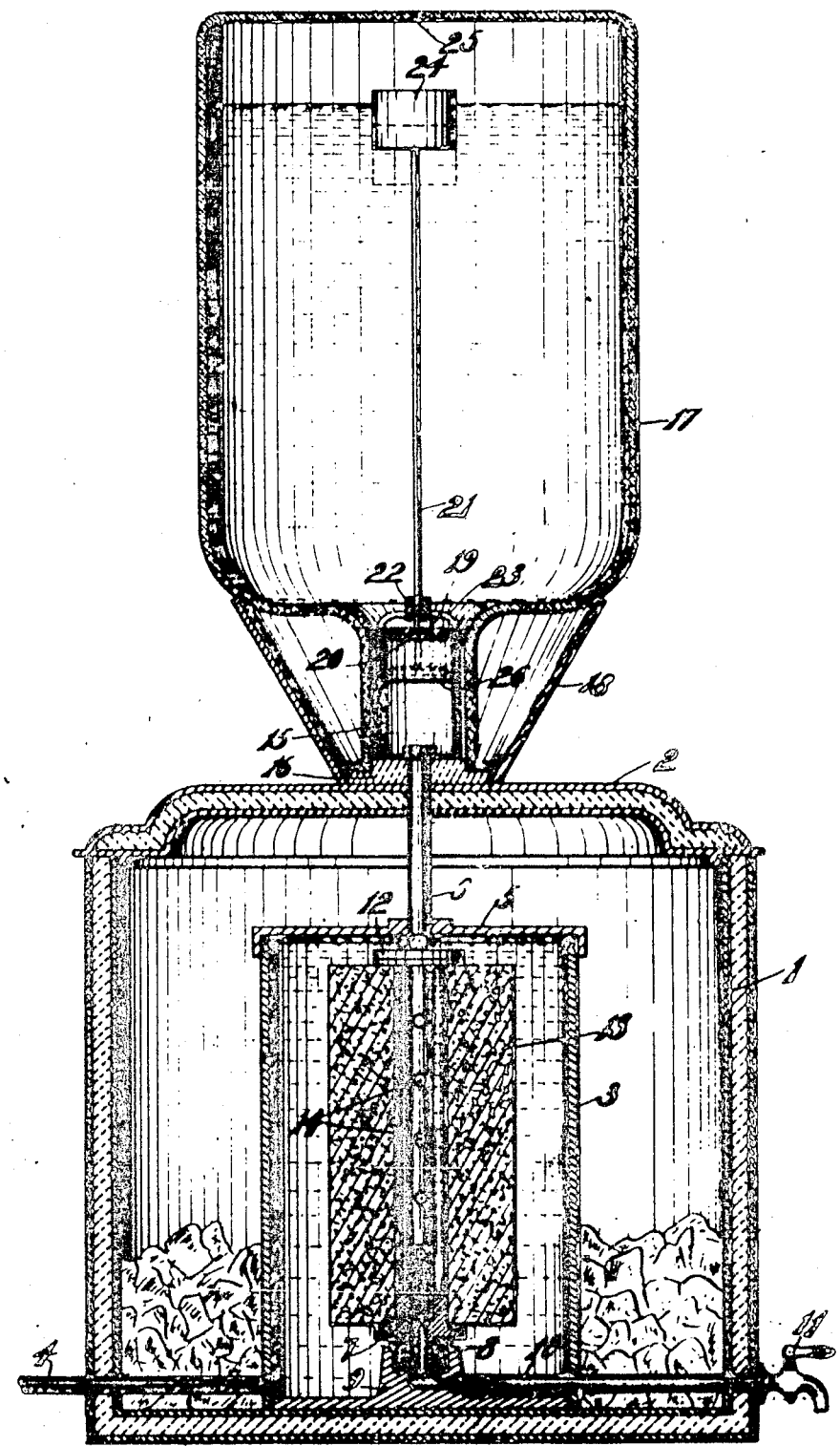

UNITED STATES PATENT OFFICE.

MAXIMILIAN GESSLER, OF MILWAUKEE, WISCONSIN.

WATER-FILTER.

956,698.　　　　Specification of Letters Patent.　　　Patented May 3, 1910.

Application filed December 18, 1909.　Serial No. 533,923.

*To all whom it may concern:*

Be it known that I, MAXIMILIAN GESSLER, residing in Milwaukee, in the county of Milwaukee and State of Wisconsin, have invented new and useful Improvements in Water-Filters, of which the following is a description, reference being had to the accompanying drawings, which are a part of this specification.

This invention has for its object to provide a water filter adapted for connection with the pressure main of a water supply system and having a reservoir for containing a quantity of filtered water exposed to view and from which the water is drawn through a faucet as needed, there being automatic means for checking the flow of water when a predetermined quantity has been supplied to the reservoir, and thus assure the presence of an ample reserve of filtered water for supplying the demand upon the filter at times when the restricted flow through the filter stone would be insufficient.

With the above and other objects in view the invention consists in the water filter herein claimed, its parts and combinations of parts and all equivalents.

In the accompanying drawing the figure represents a sectional view of a filter constructed in accordance with this invention.

In this drawing 1 indicates a casing, preferably of heat insulating construction, with a removable cover 2 and containing an inner casing 3 having a pipe connection 4 leading thereto from the water main or other suitable source of drinking water supply. The inner casing 3 is tightly sealed by a cover 5 so as to prevent the leakage of water therefrom and a tube 6 passing vertically through said cover and the cover 2 of the outer casing enters a nipple 7 at its lower end which is fitted within a packing gland 8 in a boss 9 at the bottom of the casing 3 and communicates with a discharge pipe 10 passing out through the walls of both casings and having a faucet 11 from which the filtered water may be drawn. Surrounding the tube 6 and clamped between the flange of nipple 7 and rings 12 on said tube is a hollow cylindrical filter stone 13 through which the water percolates from the interior of the casing 3 to the central opening of said filter stone where it enters tube 6 by passing through suitable openings 14 therein.

On the upper end of the tube 6 is threaded a cylindrical valve chamber 15 bearing on a flanged disk shaped gasket 16 of rubber or other suitable material which forms a seal for a glass reservoir 17 in the shape of an inverted bottle resting on said gasket and having its neck portion hidden from view by a funnel shaped guard 18 surrounding it and extending upwardly from the cover 2. The tube 6 communicates with the interior of the cylindrical valve casing 15 and the opening 19 in the upper end of said valve casing is controlled by means of a rubber faced disk valve 20 carried on the lower end of a stem 21 which passes through said opening and is guided in a bearing 22 carried by an arched support 23 on the top of the valve casing. At the upper end of the stem 21 is a float 24 which, when the water within the reservoir 7, admitted through the tube 6 from the filter stone has reached a predetermined level, will be lifted thereby and cause the valve 20 to become seated around the opening 19 so as to check the further inflow of water, there being a vent opening 25 in the top of the reservoir to freely permit the change in level of the water contained therein. To limit the downward movement of the valve 20 a pin 26 extends across the valve chamber 15 to be engaged thereby so that there is no possibility of the valve lowering sufficiently to close the communication from the valve chamber to the tube 6.

In use, the water under pressure entering the casing 3 is cooled, by means of a packing of ice between the casing 3 and the casing 1 and finds its way through the filter stone 13 to the tube 6 by which it is conducted to the valve chamber 15 and thence past the open valve 20 into the reservoir 17 where it will continue to rise until the predetermined level has been reached when it lifts the float 24 and closes the valve 20 to prevent a further inflow. When the faucet 11 is opened it draws water from the tube 6 and as the demand is greater than the filter stone will supply direct the reserve supply contained in the reservoir is drawn on, the valve 20 opening because of the removal of the pressure from beneath it and permitting the water from the reservoir to pass thereby and through the tube 6. As soon as the faucet 11 is closed the filter begins to recharge the reservoir with filtered water which is free to flow until the predetermined level is reached when the valve is again closed by the float as before described and further movement of the water ceases.

With this invention the glass reservoir not only serves as a means for storing filtered water so as to have a quantity thereof at hand when unusual demand is made therefor, and thus avoid the delay in having to await the action of the filter stone, but by means thereof the clear filtered water is kept in view at all times. The mechanism in the neck portion of the reservoir is preferably hidden from view by the guard as shown, and the stem and float may be made of glass if so desired so that they will be less noticeable.

I desire it to be understood that this invention is not limited to any specific form or arrangement of parts except in so far as such limitations are specified in the claim.

What I claim as new and desire to secure by Letters Patent is:

A filter, comprising an outer casing, a cover therefor, an inner casing contained within the outer casing, means for admitting water under pressure to the inner casing, the space between the inner casing and the outer casing being adapted to receive ice for cooling the water within the inner casing, a filter stone within the inner casing, a tube leading therefrom through the cover of the outer casing, a flanged gasket surrounding the tube, a cylindrical casing threaded on the upper end of the tube and bearing on the gasket, an inverted glass bottle mounted on the cover by having the cylindrical casing fitting within the neck portion thereof and having its mouth fitted upon the flanged gasket, a guard on the cover surrounding the neck of the bottle to hide the cylindrical casing from view, said bottle constituting a reservoir to receive filtered water from the tube through the cylindrical casing, inwardly extending flanges at the upper end of the cylindrical casing forming a valve seat, a valve contained within the cylindrical casing to close communication between the tube and the reservoir when seated on the flange, an arched guide on the cylindrical casing, a stem connected with the valve and slidably mounted through the guide, and a float carried by the stem for closing the valve when the water reaches a predetermined level in the reservoir, there being a vent opening in the upper portion of the reservoir.

In testimony whereof, I affix my signature in presence of two witnesses.

MAXIMILIAN GESSLER.

Witnesses:
R. S. C. CALDWELL,
ANNA SCHMIDTBAUER.